US006618547B1

(12) United States Patent
Peters et al.

(10) Patent No.: US 6,618,547 B1
(45) Date of Patent: *Sep. 9, 2003

(54) ELECTRONIC FILM EDITING SYSTEM USING BOTH FILM AND VIDEOTAPE FORMAT

(75) Inventors: Eric C. Peters, Carlisle, MA (US); Patrick D. O'Connor, Framingham, MA (US); Michael E. Phillips, Brookline, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,932

(22) Filed: May 4, 1999

Related U.S. Application Data

(60) Continuation of application No. 08/393,877, filed on Feb. 24, 1995, now Pat. No. 5,930,445, which is a division of application No. 07/908,192, filed on Jul. 1, 1992, now abandoned.

(51) Int. Cl.[7] ................................................. H04N 5/76
(52) U.S. Cl. ........................... 386/52; 386/129; 348/96; 348/97
(58) Field of Search ........................... 386/131, 54, 52, 386/129, 96, 64, 46, 124, 55; 348/97, 96

(56) References Cited

U.S. PATENT DOCUMENTS

| 2,927,154 A | 3/1960 | Wolfe et al. |
| 3,184,542 A | 5/1965 | Horsley |
| 3,721,757 A | 3/1973 | Ettlinger |
| 3,740,463 A | 6/1973 | Youngstrom et al. |
| 3,748,381 A | 7/1973 | Strobele et al. |
| 3,824,336 A | 7/1974 | Gould et al. |
| 3,925,815 A | 12/1975 | Lemelson |

FOREIGN PATENT DOCUMENTS

| DE | 3925046 | 1/1991 |
| EP | 0 113 993 | 7/1984 |
| EP | 0438299 A2 | 7/1991 |
| EP | 0473322 | 3/1992 |
| EP | 473322 A1 | 4/1992 |
| EP | 0481446 | 4/1992 |
| EP | 0515031 A2 | 11/1992 |
| GB | 2 235 815 | 3/1991 |
| WO | WO91/06182 | 5/1991 |
| WO | WO93/21588 | 10/1993 |
| WO | WO 94/01971 | * 1/1994 | ............ H04N/7/01 |

OTHER PUBLICATIONS

U.S. patent application Ser. No. 08/418,863, Peters et al., filed Apr. 7, 1995.
U.S. patent application Ser. No. 09/391,851, Peters et al., filed Sep. 9, 1999.

(List continued on next page.)

Primary Examiner—Vincent Boccio
Assistant Examiner—James A. Fletcher
(74) Attorney, Agent, or Firm—Peter J. Gordon

(57) ABSTRACT

A system for generating a digital representation of a video signal comprised of a sequence of video frames which each include two video fields of a duration such that the video plays at a first prespecified rate of frames per second. The sequence of video frames includes a prespecified number of redundant video fields. Redundant video fields in the video frame sequence are identified by a video processor, and the video frame sequence is digitized by an analog to digital convertor, excluding the identified redundant video fields. The digitized video frames are then compressed by a video compressor to generate a digital representation of the video signal which plays at a second prespecified rate of frames per second.

63 Claims, 7 Drawing Sheets

U.S. PATENT DOCUMENTS

| | | |
|---|---|---|
| 4,040,098 A | 8/1977 | Beeson et al. |
| 4,100,607 A | 7/1978 | Skinner |
| 4,179,712 A | 12/1979 | Opelt |
| 4,184,177 A | 1/1980 | Millward |
| 4,213,163 A | 7/1980 | Lemelson |
| 4,283,745 A | 8/1981 | Kuper et al. |
| 4,295,154 A | 10/1981 | Hata et al. |
| 4,390,904 A | 6/1983 | Johnston et al. |
| 4,413,289 A | 11/1983 | Weaver et al. |
| 4,479,146 A | 10/1984 | Cohn |
| 4,500,908 A | 2/1985 | Mandeberg |
| 4,521,870 A | 6/1985 | Babbel et al. |
| 4,538,188 A | 8/1985 | Barker et al. |
| 4,567,531 A | 1/1986 | Tabata |
| 4,567,532 A | 1/1986 | Baer et al. |
| 4,587,572 A | 5/1986 | DiGiulio |
| 4,591,931 A | 5/1986 | Baumeister |
| 4,612,569 A | 9/1986 | Ichinose |
| 4,675,755 A | 6/1987 | Baumeister et al. |
| 4,685,003 A | 8/1987 | Westland |
| 4,688,106 A | 8/1987 | Keller et al. |
| 4,689,683 A | 8/1987 | Efron |
| 4,698,682 A | 10/1987 | Astle |
| 4,709,277 A | 11/1987 | Ninomiya et al. |
| 4,717,971 A | 1/1988 | Sawyer |
| 4,723,181 A | 2/1988 | Hickok |
| 4,746,994 A | 5/1988 | Ettlinger |
| 4,750,050 A | 6/1988 | Belmares-Sarabia et al. |
| 4,752,834 A | 6/1988 | Koombes |
| 4,754,342 A | 6/1988 | Duffy |
| 4,755,889 A | 7/1988 | Schwartz |
| 4,777,537 A | 10/1988 | Ueno et al. |
| 4,785,349 A | 11/1988 | Keith et al. |
| 4,786,979 A | 11/1988 | Claus et al. |
| 4,792,864 A | 12/1988 | Watanabe et al. |
| 4,823,285 A | 4/1989 | Blancato |
| 4,837,638 A | 6/1989 | Fullwood |
| 4,841,503 A | 6/1989 | Yamada et al. |
| 4,851,906 A | 7/1989 | Koga et al. |
| 4,864,429 A | 9/1989 | Eigeldinger et al. |
| 4,868,687 A | 9/1989 | Penn et al. |
| 4,879,611 A | 11/1989 | Fukui et al. |
| 4,891,715 A | 1/1990 | Levy |
| 4,899,229 A | 2/1990 | Hashimoto |
| 4,901,161 A | 2/1990 | Giovanella |
| 4,918,523 A | 4/1990 | Simon et al. |
| 4,918,588 A | 4/1990 | Barrett et al. |
| 4,935,816 A | 6/1990 | Faber |
| 4,937,685 A | 6/1990 | Barker et al. |
| 4,941,125 A | 7/1990 | Boyne |
| 4,942,476 A | 7/1990 | Koga et al. |
| 4,949,193 A | 8/1990 | Kiesel |
| 4,953,024 A | 8/1990 | Caronna |
| 4,964,004 A | 10/1990 | Barker |
| 4,969,042 A | 11/1990 | Houtman et al. |
| 4,970,663 A | 11/1990 | Bedell et al. |
| 4,972,274 A | 11/1990 | Becker et al. |
| 4,974,178 A | 11/1990 | Izeki et al. |
| 4,979,050 A | 12/1990 | Westland et al. |
| 4,989,191 A | 1/1991 | Kuo |
| 4,998,167 A | 3/1991 | Jaqua |
| 4,998,287 A | 3/1991 | Katznelson et al. |
| 5,006,939 A | 4/1991 | Cawley |
| 5,045,940 A | 9/1991 | Peters et al. |
| 5,091,849 A | 2/1992 | Davis et al. |
| 5,099,337 A | 3/1992 | Cury |
| 5,109,482 A | 4/1992 | Bohrman |
| 5,115,311 A | 5/1992 | Jaqua |
| 5,119,188 A | 6/1992 | McCalley et al. |
| 5,121,470 A | 6/1992 | Trautman |
| 5,124,807 A | 6/1992 | Dunlap et al. |
| 5,134,496 A | 7/1992 | Schwab et al. |
| 5,138,440 A | 8/1992 | Radice |
| 5,138,459 A | 8/1992 | Roberts et al. |
| 5,140,414 A | 8/1992 | Mowry |
| 5,173,953 A | 12/1992 | Wataya et al. |
| 5,182,771 A | 1/1993 | Munich et al. |
| 5,191,427 A | 3/1993 | Richards et al. |
| 5,192,999 A | 3/1993 | Graczyk et al. |
| 5,206,929 A | 4/1993 | Langford et al. |
| 5,218,672 A | 6/1993 | Morgan et al. |
| 5,231,501 A | 7/1993 | Sakai |
| 5,233,438 A | 8/1993 | Funahashi et al. |
| 5,237,648 A | 8/1993 | Mills et al. |
| 5,249,056 A | 9/1993 | Foung et al. |
| 5,255,083 A | 10/1993 | Capitant et al. |
| 5,255,091 A * | 10/1993 | Lyon et al. ................. 348/443 |
| 5,257,113 A | 10/1993 | Chen et al. |
| 5,260,787 A | 11/1993 | Capitant et al. |
| 5,262,877 A | 11/1993 | Otsuka |
| 5,267,351 A | 11/1993 | Reber et al. |
| 5,283,819 A | 2/1994 | Glick et al. |
| 5,287,420 A | 2/1994 | Barrett |
| 5,319,453 A | 6/1994 | Copriviza et al. |
| 5,321,500 A | 6/1994 | Capitant et al. |
| 5,329,616 A | 7/1994 | Silverbrook |
| 5,353,391 A | 10/1994 | Cohen et al. |
| 5,355,450 A | 10/1994 | Garmon et al. |
| 5,374,954 A | 12/1994 | Mowry |
| 5,384,667 A | 1/1995 | Beckwith |
| 5,388,197 A | 2/1995 | Rayner |
| 5,390,028 A | 2/1995 | Kobayashi et al. |
| 5,406,326 A | 4/1995 | Mowry |
| 5,412,773 A | 5/1995 | Carlucci et al. |
| 5,426,652 A * | 6/1995 | Heiman ..................... 714/746 |
| 5,442,744 A | 8/1995 | Piech et al. |
| 5,457,491 A | 10/1995 | Mowry |
| 5,459,529 A | 10/1995 | Searby et al. |
| 5,506,932 A | 4/1996 | Holmes et al. |
| 5,513,306 A | 4/1996 | Mills et al. |
| 5,565,998 A | 10/1996 | Coombs et al. |
| 5,568,275 A | 10/1996 | Norton et al. |
| 5,577,190 A | 11/1996 | Peters |
| 5,584,006 A | 12/1996 | Reber et al. |
| 5,640,601 A | 6/1997 | Peters |
| 5,649,046 A | 7/1997 | Stewart et al. |
| 5,724,605 A | 3/1998 | Wissner |
| 5,752,029 A | 5/1998 | Wissner |
| 5,754,851 A | 5/1998 | Wissner |
| 5,808,628 A | 9/1998 | Hinson et al. |
| 5,825,967 A | 10/1998 | Stewart et al. |
| 5,905,841 A | 5/1999 | Peters et al. |
| 5,930,445 A | 7/1999 | Peters et al. |
| 5,946,445 A | 8/1999 | Peters et al. |
| 5,999,173 A | 12/1999 | Ubilos |
| 6,018,337 A | 1/2000 | Peters et al. |
| 6,058,236 A | 5/2000 | Peters et al. |
| 6,061,758 A | 5/2000 | Reber et al. |
| 6,118,444 A | 9/2000 | Garmon et al. |
| 6,249,280 B1 | 6/2001 | Garmon et al. |

OTHER PUBLICATIONS

U.S. patent application Ser. No. 09/545,360, Frink et al., filed Apr. 7, 2000.

U.S. patent application Ser. No. 09/565,968, Reber et al., filed May 5, 2000.

U.S. patent application Ser. No. 09/971,236, Peters et al., filed Oct. 4, 2001.

"A Sound Editor's Guide to Lightworks Editing Systems," John Portnoy et al. 1st Edition, Lighworks Editing Systems, 1996.

Abekas Video Systems, Digital Disk Recorder, A62 Operations Manual, Jan. 1990.

Ampex Digital Optics, ADO 3000 Operator's Guide, Dec. 1984.

Anderson, Gary, "Video Editing", 2nd Ed., Knowledge Industry Publications, 1988, pp. Contents, 1–10, 90–96, 183–190.

Hollyn, Norman, "the Film Editing Room Handbook", Second Edition, Apr. 1990, Contents, pp. 6–7, 116–121.

Avid/1 Media Composer, Product Description, The First Affordable 30 FPS Digital Non–Linear Editor, Apr. 1989.

Avid/1 Media Composer User Manual Books I & II Beta Version, Avid Technology, Inc., 1989.

Avid/1 Media Composer User Manual Book III Beta Version, Avid Technology, Inc., 1989.

Avid/1 Media Composer User's Guide Version 2.0, Avid Technology, Inc., 1990.

Borish, Jeffrey, et al., "SoundDroid: A New System for Electronic Post–Production of Sound", SMPTE Journal, May 1986, pp. 567–571.

Browne, Steven E., "Videotape Editing", 2nd Ed., Focal Press, 1993, pp. vii–xiii, pp. 3–12, 199–204, 223–235.

CMX 6000 Disk–Based Audio And Video Editing System, C. Hardman, International Broadcast Engineer, vol. 18, p. 37, Mar. 1987.

CMX 6000 (4 page product brochure), Mar. 1988.

CMX 6000 (5 page product brochure), Mar. 1987.

The CMX 6000 Manual Supplement, CLSI, Version 2.2, Jun. 1, 1989.

DiGiulio, Edmund M., "SMPTE Study Group on 30–Frame Film Rate: Final Committee Report on the Feasibility of Motion–Picture Frame–Rate Modifications to 30 Frames/sec", Engineering Committee Report, SMTE Journal, May 1988, pp. 404–408.

Duffy, Robert et al., "A New Approach To Film Editing", SMPTE Journal, Feb. 1982, pp. 198–203.

Fluent Machines System Architecture Overview, pp. 1–15.

Fluent Machines Inc. Center Stage Application Environment (5 pages).

Fluent Machines Inc. Compressor/Decompressor (CODEC) (3 pages).

Fluent Machines Inc. FM/1 Multimedia Development System (5 pages).

Fluent Machines Inc Factsheet, "The Most Powerful Multimedia Standard Just Became The Easiest To Use.", Fluent Multimedia: Extending The Capabilities Of DVI (8 pages).

Fluent Machines Inc. Corporate Fact Sheet, May, 1990.

Lightworks Operating Manual, Issue 1, O.L.E. Limited, Jan. 1992.

Data Translation News Release, Media 100—Industry's First Online, Nonlinear Video Production System Introduced by Data Translation's Multimedia Group, Jan. 11, 1992, 6 pages.

Data Translations, Media 100 Technical Highlights, "Announcing a totally new concept in the filed of video post production . . . ", 1992, 4 pages.

Data Translation, Multimedia Group Strategy And Media 100 Backgrounder, Feb. 1992, pp. ii–15.

KEM Electronik Mechanik GMBH, Technical Manual, 1992, pp. 1–48.

Mendrala, James A., "Electronic Cinematography for Motion–Picture Film", Point of View, SMPTE Journal, Nov. 1987, pp. 1090–1094.

Ohanian, Thomas A., "Digital Nonlinear Editing", Boston: Focal Press 1993, entire book.

Ohanian, Thomas A., "Digital Nonlinear Editing", 2nd Edition, Boston: Focal Press 1998, entire book.

Ohanian, Thomas A. and Phillips, Michael, "Digital Filmmaking", Focal Press 1996.

Peters, Eric C., "A Real Time, Object Oriented, Non–Linear Editing System For Film And Video", Presented at the $131^{st}$ SMPTE Technical Conf., Oct. 21–25, 1989, Preprint No. 131–91, pp. 1–10.

Peters, Eric, C., "A Real Time, Object Oriented, Non–Linear Editing System For Film And Video", Presented at the $131^{st}$ SMPTE Technical Conf., Oct. 21–25, 1989, Slides from presentation.

Peters, Eric, C., "A Real Time, Object Oriented, Non–Linear Editing System For Film And Video", Presented at the $131^{st}$ SMPTE Technical Conf., Oct. 21–25, 1989, Tape transcript of presentation.

"Papers Presented at the 131st Technical Conference", SMPTE Journal, Jan. 1990, listing 91.

"1989 Conference Audio Cassettes", SMPTE Journal, Dec. 1989, pp. 909–912, Paper #91, Audio Tape SMPTE–51.

Schneider, Arthur, "Electronic Post–Production for Film and Videotape–An Update", SMPTE Report, SMPTE Journal, Dec. 1987, pp. 1190–1192.

DP Series Reference Manual, Oct. 1992.

Quantel, Harry Operator's Manual–Reference, 2003–57–008 A, 1990.

User's Guide for the EMC2 Digital Editor Version 4.00, Editing Machines Corporation, 1992.

User's Guide: 1, Editing on the Media Composer, Avid Technology, Inc. 1991.

User's Guide: 2, Advanced Editing, Avid Technology, Inc. 1991.

"Video Tape Editing Systems", International Broadcast Engineer, vol. 19, No. 22, pp. 44–46, 48, Dec. 1988.

Amato, Mia, "Macintosh video editing evolving into a beta stage", (Macintosh Graphic Arts), MacWeek, v. 3, n. 31, p. 3(3), Aug. 22, 1989.

Anderson, Gary, "Preparing For Post Production: an excerpt from Gary Anderson's book—Video Editing, Back Stage", v. 26, p. 6B(8), Dec. 6, 1985.

Baron, S.N., "The next generation of automated record/playback systems", Broadcasting Convention, 1988, IBC 1988, International.

Bunish, Christine, "Magno Sound & Video Debuts TRANSform—1 In New York", Back Stage v. 28, p. 5(2), Jul. 31, 1987.

Guglielmo, Connie, "Mac II pushes deeper into professional markets; movies: film editing goes desktop", MacWeek, v.2, n.46, p. 1(2), Nov. 15, 1988.

Ito, Russell, "The Producers", (Macintosh film production tools), MacUser, v. 4, n10, p. 128(8), Oct. 1988.

MacNicol, Gregory, "Video Editing", Computer Graphics World, v.12, n.6, p. 87(3), Jun. 1989.

Miller, Richard, "The Many Paths Toward Conforming", Back Stage, v.26, p. 3B(3), Dec. 6, 1985.

Norton, Mark J., "A Visual EDL System".*

Davidoff, Frank, "The All–Digital Television Studio", SMPTE Journal, Jun. 1980, vol. 89, No. 6.*

Leonard, Milt, "Silicon Solution Solution Merges Video, Stills, and Voice", Electronic Design, Apr. 2, 1992.*

P. Venkat Rangan, Harric M. Vin, Kashun Chan and Ingvar A. Aaberg, "A Window–Based Editor For Digital Video and Audio", 1992 IEEE, pp. 640–648.*

A. Aaberg, "A Window–Based Editor For Digital Video and Audio", 1992 IEEE, pp. 640–648.*

Pantuso, Charles A., "Reducing Financial Aliasing in HDTV Production", Better Video Images, $23^{rd}$ Annual SMPTE Television Conference in San Francisco, CA, Feb. 3–4, 1989, pp. 157–169.*

Dickson, S. & Villarreal, B., "The Gemini Process: A Theatrical–Quality Video–to–Film Transfer Process", Better Video Images, $23^{rd}$ Annual SMPTE Television Conference, Feb. 3–4, 1989, San Francisco, CA, pp. 30–35.*

Kary, M., "Video–Assisted Film Editing System", SMPTE Journal, Jun. 1982, pp. 547–551.*

Becker, Stanley S., "Simultaneous Release On Film and Tape OFF–LINE EDLs", Nov. 1988, BME.*

Conversion with Larry Seehorn, "The Midas Touch," Videography Journal, May 1989, pp. 78–81.*

Seehorn Technologies Inc., "Midas II," nine–page brochure, Oct. 1988.*

"Editdroid–The Editing System of Choice," six–page brochure, 1985.*

Avid Technology, Media Match: A Guide to Film–Tape Transfer, 1991.*

W. Paik, "Digicipher tm–all digital, channel compatible, HDTV broadcast system", IEEE Transactions on Broadcasting, vol. 36, No. 4, Dec. 1990, (New York, US), pp. 245–254.*

P. Krieg, "Multimedia–Computer und die Zukundt des Film/Videoschnitts", FKT Fernseh–und Kino–Technik, vol. 45, No. 5, 1991, (Heidelberg, DE), pp. 252–258 (No Translation).*

Graphics Systems, Digital Video Effects and Still Stores, *International Broadcast Engineer*, vol. 19, Dec. 1988, pp. 18–19, 21.

Pank, B., "The Quantel Digital Production Centre", *International Broadcast Engineer*, vol. 18, Mar. 1987, pp. 60, 63–64.

Reed, Sharon, "Who Is Harry?", Presented at *Computer Graphics '86*, Online Publications, 1986, pp. C31–C39.

"Digital Audio Disk Developments", *International Broadcast Engineer*, vol. 11, Part 9, Nov. 1988, pp. 24–26, 28.

\* cited by examiner

FIG. 4

| RECORD Nº | EVENT | CAMROLL | SOUNDROLL | DOP | SCENE | TAKE | VTTC_IN | VTTC_OUT | DURATION |
|---|---|---|---|---|---|---|---|---|---|
| 1 | 0 | | | / / | | | | | 00:00:00 |
| 2 | 1 | A10 | | 05/28/92 | 87 | 1 | 04:00:05:25 | 04:01:23:25 | 01:18:00 |
| 3 | 2 | A10 | | 05/28/92 | 87A | 1 | 04:01:24:00 | 04:03:05:05 | 01:41:05 |
| 4 | 3 | A10 | | 05/28/92 | 87A | 4 | 04:03:07:11 | 04:03:26:06 | 00:18:25 |
| 5 | 4 | A12 | 16 | 05/28/92 | A51 | 5 | 04:03:26:13 | 04:04:48:09 | 01:21:26 |
| 6 | 5 | A12 | | 05/28/92 | A51 | 3 | 04:04:51:01 | 04:05:03:26 | 00:12:25 |
| 7 | 8 | A11 | | 05/28/92 | 57 | 5 | 04:06:41:08 | 04:07:00:05 | 00:18:27 |
| 8 | 9 | A11 | 15 | 05/28/92 | 57 | 6 | 04:08:05:14 | 04:09:27:10 | 01:21:29 |
| 9 | 10 | A11 | 15 | 05/28/92 | 57 | 8 | 04:11:02:09 | 04:12:20:08 | 01:17:29 |
| 10 | 11 | A15 | | 05/28/92 | 68 | 2 | 04:14:26:05 | 04:15:44:06 | 01:18:01 |
| 11 | 12 | A15 | 16 | 05/28/92 | 91 | 3 | 04:16:41:13 | 04:18:03:14 | 00:00:00 |
| 12 | 13 | A15 | 16 | 05/28/92 | 32 | 7 | 04:20:14:06 | 04:21:19:14 | 00:00:00 |

| RECORD Nº | NAGRA_IN | VTTC_DROP | NAGRA_DROP | KEYIN | KEYOUT | PULLIN | PULLOUT FC |
|---|---|---|---|---|---|---|---|
| 1 | | .F. | .F. | | | | |
| 2 | | .F. | .F. | KJ158165032812 | KJ158165044512 | AA | AA |
| 3 | | .F. | .F. | KJ158165044600 | KJ158165059712 | AA | AA |
| 4 | | .F. | .F. | KJ158165060101 | KJ158165062905 | BB | BB |
| 5 | 16:12:18:13 | .F. | .F. | KJ058204062910 | KJ058204075207 | CC | DD |
| 6 | | .F. | .F. | KJ058204075609 | KJ058204077513 | BB | BB |
| 7 | | .F. | .F. | KJ058171092114 | KJ058171095004 | CC | AA |
| 8 | 16:48:50:01 | .F. | .F. | KJ058171104803 | KJ058171117100 | DD | AA |
| 9 | 10:30:47:24 | .F. | .F. | KJ058171914707 | KJ058171926406 | DD | CC |
| 10 | | .F. | .F. | KJ058171945304 | KJ058171957005 | AA | BB |
| 11 | 10:45:13:13 | .F. | .F. | KJ058171965602 | KJ058171977903 | CC | DD |
| 12 | 13:35:25:07 | .F. | .F. | KJ058171997505 | KJ058171007303 | BB | DD |

THEY CAME BIN

| NAME | TRACKS | START | KN START | END | KN END | DURATION |
|---|---|---|---|---|---|---|
| 32/7 | V A1 A2 | 04:20:14:06 | KJ058171-9975+05 | 04:21:19:14 | 73+03 | 1:05:08 |
| A51/3 | V | 04:04:51:01 | KJ058204-0756+09 | 04:05:03:26 | 775+13 | 12:25 |
| A51/5 | V A1 A2 | 04:03:26:13 | KJ058204-0629+10 | 04:04:48:09 | 752+07 | 1:21:26 |
| 57/5 | V | 04:06:41:08 | KJ058171-0921+14 | 04:07:00:05 | 950+04 | 18:28 |
| 57/6 | V A1 A2 | 04:08:05:14 | KJ058171-1048+03 | 04:09:27:10 | 171+00 | 1:21:26 |
| 57/8 | V A1 A2 | 04:11:02:09 | KJ058171-9147+07 | 04:12:20:08 | 264+06 | 1:17:29 |
| 68/2 | V | 04:14:26:05 | KJ058171-9453+04 | 04:15:44:06 | 570+05 | 1:18:01 |
| 87/1 | V | 04:00:05:25 | KJI58165-0328+12 | 04:01:23:25 | 445+12 | 1:18:00 |
| 87A/1 | V | 04:01:24:00 | KJI58165-0446+00 | 04:03:05:05 | 597+12 | 1:41:05 |
| 87A/4 | V | 04:03:07:11 | KJI58165-0601+01 | 04:03:26:06 | 629+05 | 18:25 |
| 91/3 | V A1 A2 | 04:16:41:13 | KJ058171-9656+02 | 04:18:03:14 | 779+03 | 1:22:01 |

*FIG. 5*

ELECTRONIC FILM EDITING SYSTEM USING BOTH FILM AND VIDEOTAPE FORMAT

This application is a continuing application of application Ser. No. 08/393,877, filed Feb. 24, 1995, entitled ELECTRONIC FILM EDITING SYSTEM USING BOTH FILM AND VIDEOTAPE FORMAT, and now U.S. Pat. No. 5,930,445 which is a divisional application of application Ser. No. 07/908,192, filed Jul. 1, 1992, now abandoned.

BACKGROUND OF THE INVENTION

This invention relates to techniques for electronically editing film.

Film video and audio source material is frequently edited digitally using a computer system, such as the Avid/1 Media Composer from Avid Technology, Inc., of Tewksbury, Mass., which generates a digital representation of a source film, allowing a film editor to edit the digital version, rather than the film source itself. This editing technique provides great precision and flexibility in the editing process, and is thus gaining popularity over the old style of film editing using a flatbed editor.

The Avid/1 Media Composer accepts a videotape version of a source film, created by transferring the film to videotape using the so-called telecine process, and digitizes the videotape version for editing via manipulation by computer. The operation of the Media Composer is described more fully in copending U.S. patent application Ser. No. 07/866,829, filed Apr. 10, 1992, now U.S. Pat. No. 5,355,450 and entitled "Media Composer with Adjustable Source Material Compression." The teachings of that application are incorporated herein by reference. Editing of the digitized film version is performed on the Media Composer computer using CRT monitors for displaying the digitized videotape, with the details being based on videotape timecode specifications. Once editing is complete, the Media Composer creates an edited videotape and a corresponding edit decision list (EDL) which documents the videotape timecode specification details of the edited videotape. The film editor uses this EDL to specify a cut and assemble list for editing the source film. While providing many advantages over the old style flatbed film editing technique, the electronic editing technique is found to be cumbersome for some film editors who are unaccustomed to videotape timecode specifications.

SUMMARY OF THE INVENTION

In general, in one aspect, the invention provides a system for generating a digital representation of a video signal comprised of a sequence of video frames which each include two video fields of a duration such that the video plays at a first prespecified rate of frames per second. The sequence of video frames includes a prespecified number of redundant video fields. In the invention, redundant video fields in the video frame sequence are identified by a video processor, and the video frame sequence is digitized by an analog to digital convertor, excluding the identified redundant video fields. The digitized video frames are then compressed by a video compressor to generate a digital representation of the video signal which plays at a second prespecified rate of frames per second.

In preferred embodiments the invention further provides for storing the digitized representation of the video signal on a digital storage apparatus. The redundant video fields are identified by assigning a capture mask value to each video field in the video frame sequence, the capture mask value of a field being a "0" if the field is redundant and the capture rusk value of a field being a "1" for all other video fields. A video frame grabber processes the video frame sequence based on the capture mask values to exclude the identified redundant video frames from being digitized. The video compressor compresses the video frames based on JPEG video compression.

In other preferred embodiments, the first prespecified video play rate is 29.97 frames per second and the second prespecified digital video play rate is 24 frames per second. The rate of the analog video signal is increased from 29.97 frames per second to 30 frames per second before the step of digitizing the video frame sequence. In further preferred embodiments, the analog video signal is a video representation of film shot at 24 frames per second, and the digital video play rate of 24 frames per second corresponds to the 24 frames per second film shooting rate. The analog video signal is a representation of film that is transferred to the video representation using a telecine apparatus.

In general, in another aspect, the invention provides an electronic editing system for digitally editing film shot at a first prespecified rate and converted to an analog video representation at a second prespecified rate. The editing system includes analog to digital converting circuitry for accepting the analog video representation of the film, adjusting the rate of the analog video such that the rate corresponds to the first prespecified rate at which the film was shot, and digitizing the adjusted analog video to generate a corresponding digital representation of the film. Further included is a digital storage apparatus for storing the digital representation of the film, and computing apparatus for processing the stored digital representation of the film to electronically edit the film and correspondingly edit the stored digital representation of the film.

In preferred embodiments, the system further includes digital to analog converting circuitry for converting the edited digital representation of the film to an analog video representation of the film, adjusting the rate of the analog video from the first prespecified rate to the second prespecified video rate, and outputting the adjusted analog video. Preferably, the analog video representation of the film accepted by the analog to digital converting circuity is an NTSC videotape. The apparatus for storing the digital representation of the film also stores a digitized version of a film transfer log corresponding to the digital representation of the film. The system includes display apparatus for displaying the digitized version of the film as the film is electronically edited and displaying a metric for tracking the location of a segment of the film as the segment is displayed, the metric being based on either film footage code or video time code, as specified by the system user.

The electronic editing system of the invention allows users to provide the system with film formatted on standard videotapes, NTSC tapes, for example, and yet allows the video to be digitally edited as if it were film, i.e., running at film speed, as is preferred by most film editors. By reformatting the analog video as it is digitized, the system provides the ability to electronically edit film based on the same metric used in conventional film editing.

BRIEF DESCRIPTION OF THE DRAWINGS

FIG. 4 is an Evertz Film Transfer Log produced by the telecine transfer system and processed by the editing system of the invention.

FIG. 5 is an illustration of a video screen showing the electronic bin generated by the editing system of the invention.

DESCRIPTION OF THE PREFERRED EMBODIMENT

Figure 1:
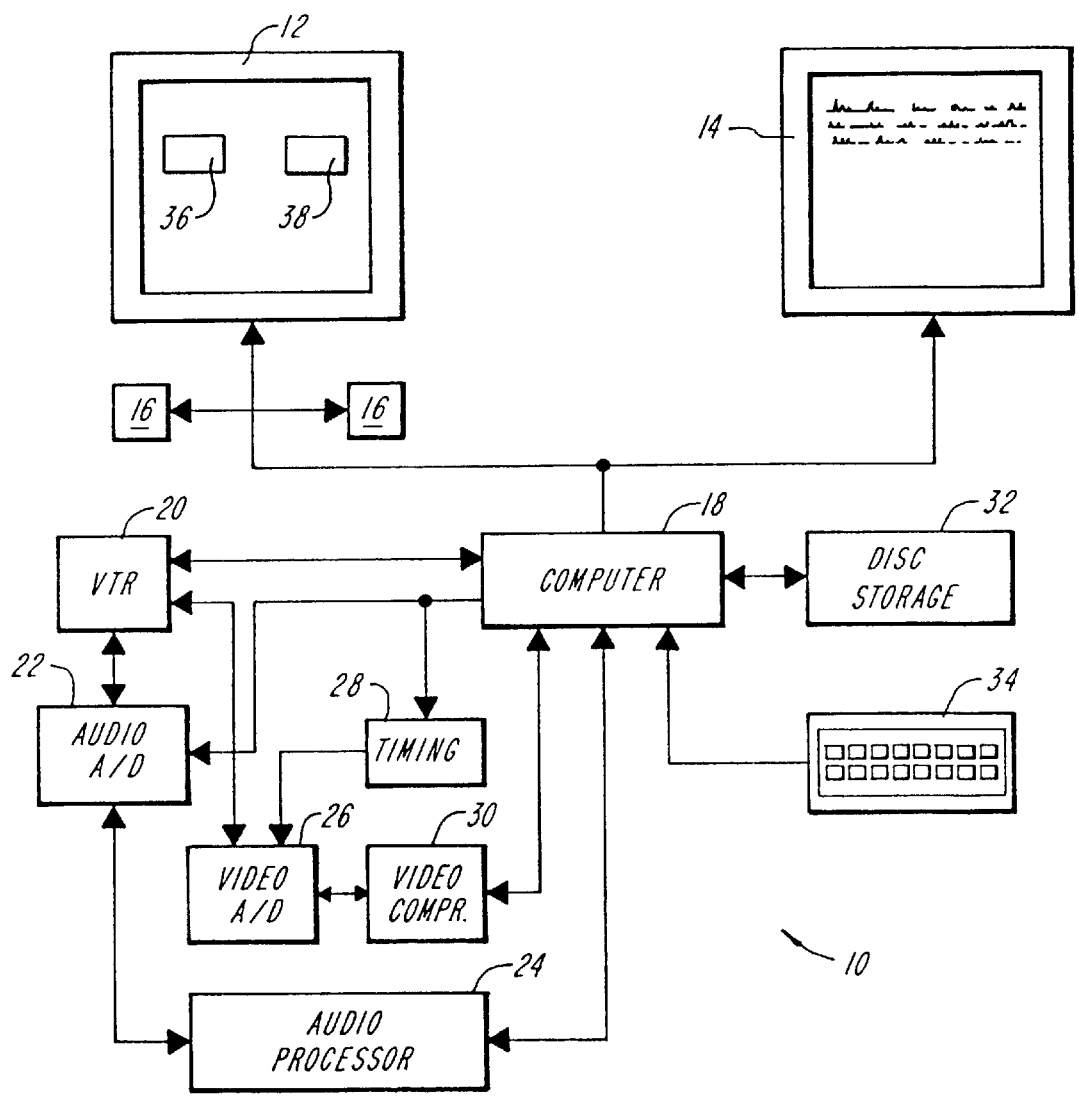
FIG. 1 is a schematic diagram of the electronic editing system of the invention.

Referring to FIG. 1, there is shown the electronic editing system of the invention 10, including two CRT displays 12, 14 for displaying digitized film during an editing session, and an audio output device 16, for example, a pair of speakers, for playing digitized audio during an editing session. The displays 12, 14 and audio output 16 are all controlled by a computer 18. Preferably, the computer is a Macintosh™ $II_{ci}$, $II_{fx}$, Quadra 900, or Quadra 950 all of which are available from Apple Computer, Inc., of Cupertino, Calif. The system includes a video tape recorder (VTR) 20 for accepting an electronic version of film footage, which is preprocessed and digitized by a video analog to digital converter (A/D) 26. A timing circuit 28 controls the speed of the video being digitized, as described below. A video compressor 30 is connected to the video A/D for compressing the electronic image data to be manipulated by the computer 18. An audio A/D 22 and audio processor 24 process audio information from the electronic version of film footage in parallel with the video processing. Disc storage 32 communicates with the computer to provide memory storage for digitized electronic image data. This disc storage may be optical, magnetic, or some other suitable media. The editing system is user-interfaced via a keyboard 34, or some other suitable user control interface.

In operation, video and audio source material from a film which has been transferred to a videotape is received by the system via the video tape recorder 20, and is preprocessed and digitized by the audio A/D 22, audio processor 24, video A/D 26, and video compressor 30, before being stored in the disc storage 32. The computer is programmed to display the digitized source video on a first of the CRTs 12 and play the accompanying digitized source audio on the audio output 16. Tippically source material is displayed in one window 36 of the first CRT 12 and edited material is displayed in a second window 38 of that CRT. Control functions, edit update information, and commands input from the keyboard 32 are typically displayed on the second system CRT 14.

Once a film is input to the system, a film editor may electronically edit the film using the keyboard to make edit decision commands. As will be explained in detail below, the electronic editing system provides the film editor with great flexibility, in that the video displayed on the system CRT 12 may be measured and controlled in either the domain of film footage or the domain of videotape time code. This flexibility provides many advantages over prior electronic editing systems. At the end of an editing session, the electronic editing system provides the film editor with an edited videotape and both tape and film edit command lists for effecting the edits from the session on film or videotape.

As explained above, the electronic editing system 10 requires a videotape version of a film for electronic manipulation of that film. Such a tape is preferably generated by a standard film-tape transfer process, the telecine process, which preferably uses the Time Logic Controller™ telecine (TLC), a device that converts film into a video signal, then records the signal on videotape. A TLC controls the film-tape transfer more precisely than non-TLC systems. In addition, it outputs a report, described below, that includes video format specifications, i.e., timecode, edge number, audio timecode, scene, and take for each reference frame in each tape, thereby eliminating the need to search through the video or film footage manually to find the data required for creating a log of video playing particulars. Other telecine systems may be used, however, depending on particular applications.

Transfer from film to tape is complicated by the fact that film and video play at different rates—film plays at 24 frames per second (fps), whereas PAL video plays at 25 fps and NTSC (National Television Standards Committee) video plays at 29.97 fps. If the film is shot at the standard rate of 24 fps and then transferred to 29.97 fps NTSC video, the difference between the film and video play rates is large (and typically unacceptable). As a result, the film speed must be adjusted to accommodate the fractional tape speed, and some film frames must be duplicated during the transfer so that both versions have the same duration. However, if the film is shot at 29.97 fps, then transferring the footage to NTSC video is simple. Each film frame is then transferred directly to a video frame, as there are the same number of film and video frames per second.

Considering the most common case, in which 24 fps film is to be transferred to 29.97 fps NTSC videotape, the telecine process must provide both a scheme for slowing the film and a frame duplication scheme. The film is slowed down by the telecine apparatus by 0.1% of the normal film speed, to 23.976 fps, so that when the transfer is made, the tape runs at 29.97 fps, rather than 30 fps. To illustrate the frame duplication scheme, in the simplest case, and disregarding the film slow-down requirement, one second of film would be transferred to one second of video. The one second of film would include 24 frames of film footage but the corresponding one second of video would require 30 frames of footage. To accommodate this discrepancy, the telecine process duplicates one film frame out of every four as the film is transferred to tape, so that for each second of film footage, the corresponding second of tape includes six extra frames, Each video frame generated by the telecine process is actually a composite of two video fields: an odd field, which is a scan of the odd lines on a video screen, and an even field, which is a scan of the even lines. A video field consists of 262½ scan lines, or passes of an electron beam across a video screen. To create a full video frame comprised of 525 scan lines, an odd field, or scan of the odd lines, is followed by an even field, or scan of the even lines. Thus, when a duplicate video frame is generated and added in the telecine process, duplicate video fields are actually created. During play of the resulting tape, each two video fields are interlaced to make a single frame by scanning of the odd lines (field one) followed by scanning of the even lines (field two) to create a complete frame of NTSC video.

Figure 2:
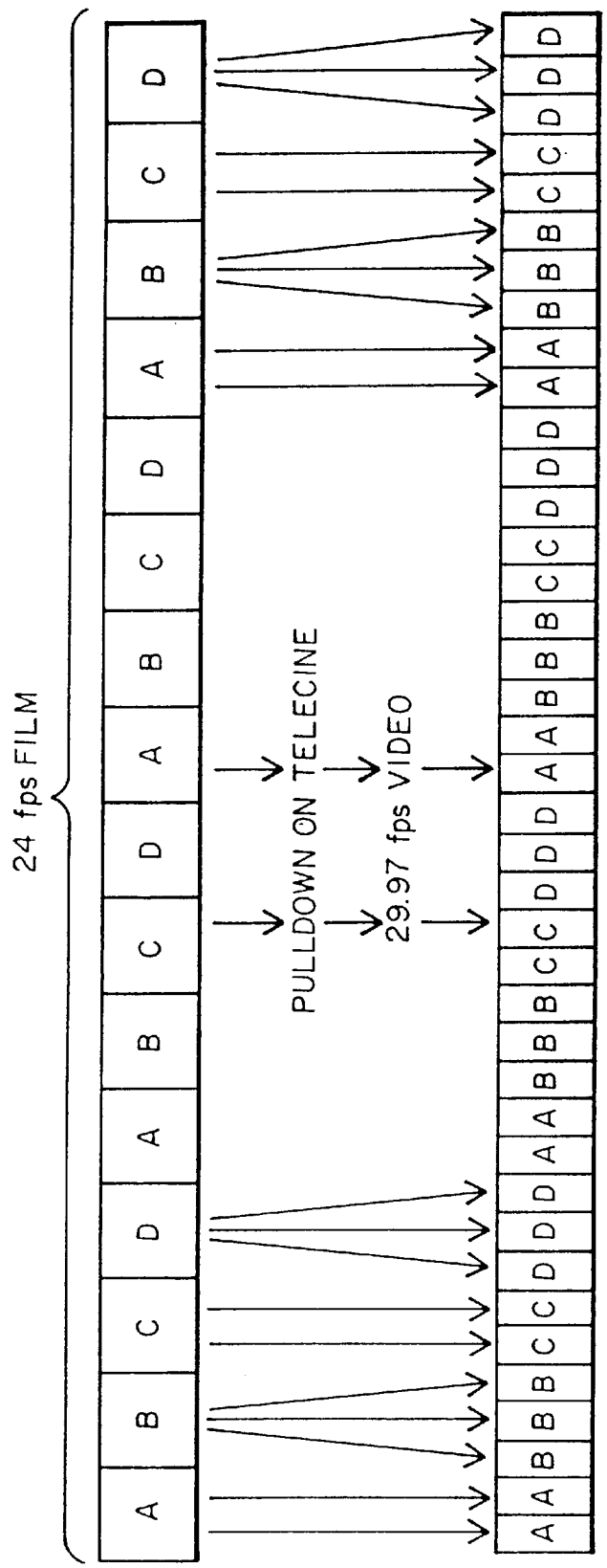
FIG. 2 is a diagram of the telecine film-tape transfer pulldown scheme.

There are two possible systems for creating duplicate video fields in the telecine process, those systems being known as 2-3 pulldown and 3-2 pulldown. The result of the 2-3 pulldown process is schematically illustrated in FIG. 2. In a film-tape transfer using 2-3 pulldown, the first film frame (A in FIG. 2) is transferred to 2 video fields AA of the first video frame; the next film frame B is transferred to 3 video fields BBB, or one and one half video frames, film frame C is transferred to two video fields CC, and so on. This 2-3 pulldown sequence is also referred to as a SMPTE-A transfer. In a 3-2 pulldown transfer process, this sequence of duplication is reversed; the first film frame A would be mapped to 3 video fields, the next film frame B would be mapped to 2 video fields, and so on. This 3-2 pulldown sequence is also referred to as a SMPTE-B transfer. In either case, 4 frames of film are converted into 10 video fields, or 5 frames of video footage. When a 2-3 pulldown sequence is used, an A, B, C, D sequence in the original film footage creates an AA, BB, BC, CD, DD sequence of fields in the video footage, as shown in FIG. 2. The telecine process slows down the film before the frame transfer and duplication process, so that the generated video frames run at 29.97 fps.

Figure 3:
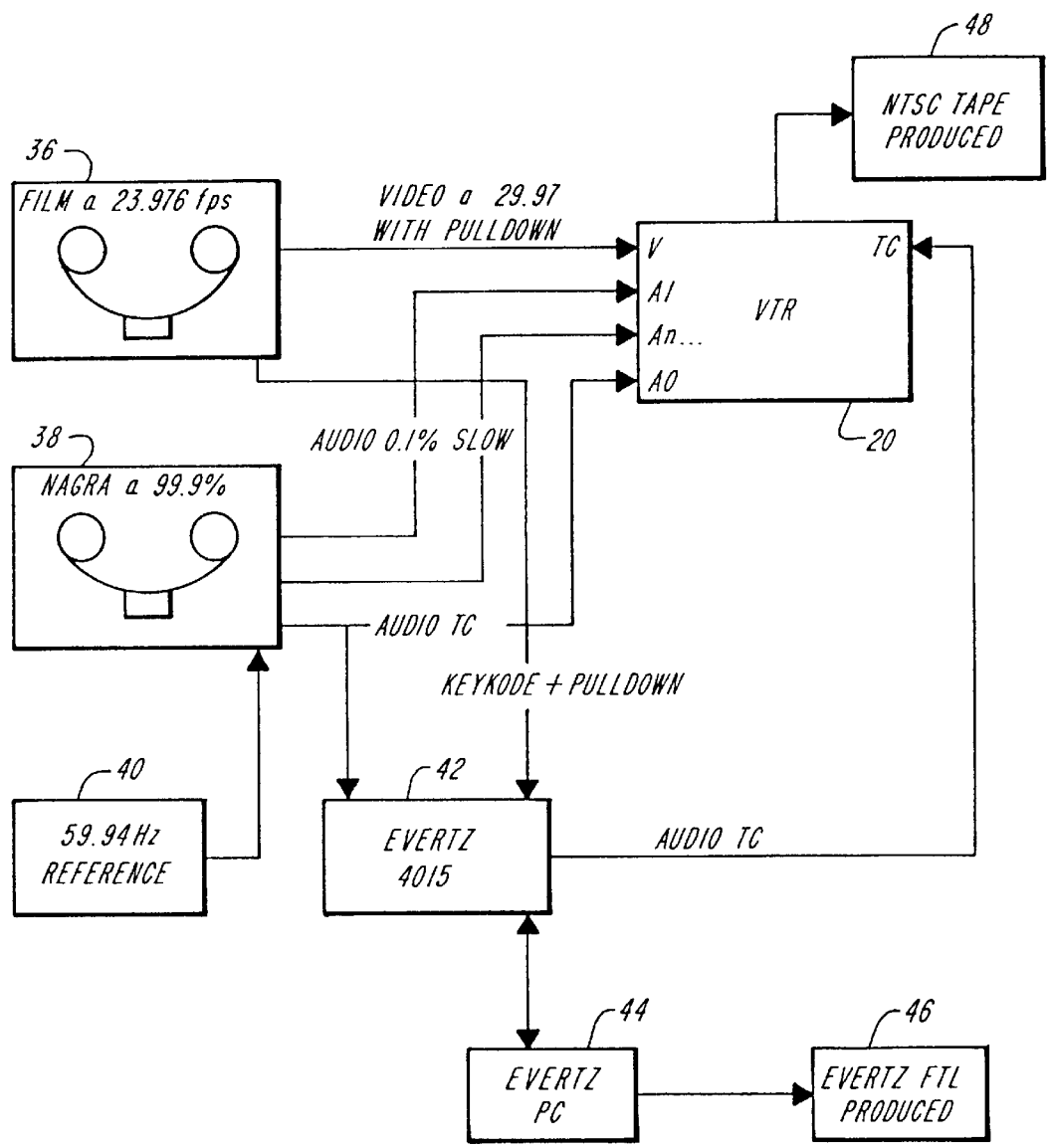
FIG. 3 is a schematic diagram of the telecine film-tape transfer system.

Referring to FIG. 3, as discussed above, the telecine 36 produces a video signal from the film; the video is generated to run at 29.97 fps and includes redundant film frames from the pulldown scheme. NAGRAT™ audio timecode is the typical and preferable system used with films for tracking the film to its corresponding audiotape. During the telecine process, a corresponding audio track 38 is generated based on the NAGRA™ and is slowed down by 0.1% so that it is synchronized to the slowed film speed. The sound from the film audiotrack is provided at 60 Hz; a timing reference 40 at 59.94 Hz slows the audio down as required. Thus, the telecine process provides, for recordation on a videotape 48 via a videotape recorder 20, a video signal (V in the figure), corresponding audio tracks, $A_1$–$A_n$, and the audio timecode (audio TC).

A further film-tape correspondence is generated by the telecine process. This is required because, in addition to the difference between film and video play rates, the two media employ different systems for measuring and locating footage. Film is measured in feet and frames. Specific footage is located using edge numbers, also called edge code or latent edge numbers, which are burned into the film. For example, Kodak film provides Keykode™ on the film to track footage. The numbers appear once every 16 frames, or once every foot, on 35 mm film. The numbers appear once every 20 frames, or every half foot, on 16 mm film. Note that 35 mm film has 16 frames per foot, while 16 mm film has 40 frames per foot. Each edge number includes a code for the film manufacturer and the film type, the reel, and a footage counter. Frames between marked edge numbers are identified using edge code numbers and frame offsets. The frame offset represents the frame's distance from the preceding edge number.

Videotape footage is tracked and measured using a timebase system. Time code is applied to the videotape and is read by a time code reader. The time code itself is represented using an 8-digit format: XX:XX:XX:XX—hours:minutes:seconds:frames. For example, a frame occurring at 11 minutes, 27 seconds, and 19 frames into the tape would be represented as 00:11:27:19.

It is preferable that during the telecine conversion, a log, called a Film Transfer Log (FTL), is created that makes a correspondence between the film length-base and the video time-base. The FTL documents the relationship between one videotape and the raw film footage used to create that tape, using so-called sync points. A sync point is a distinctive frame located at the beginning of a section of film, say, a clip, or scene, which has been transferred to a tape. The following information documents a sync point: edge number of the sync point in the film footage, time code of the same frame in the video footage, the type of pulldown sequence used in the transfer, i.e., 2-3 pulldown or 3-2 pulldown, and the pulldown mode of the video frame, i.e., which of the A, B, C, and D frames in each film five-frame series corresponds to the sync point frame.

As shown in FIG. 3, an Evertz 4015 processor accepts the video signal from the telecine and the audio TC corresponding to the audiotrack and produces a timecode based on a synchronization of the audio and video. Then an Evertz PC 44 produces an Evertz FTL 46 which includes the sync point information defined above.

FIG. 4 illustrates a typical Evertz FTL 46. Each column of the log, specified with a unique Record #, corresponds to one clip, or scene on the video. Of particular importance in this log is the VideoTape Time Code In (VTTC IN) column 50 and VideoTape Time Code Out (VTTC OUT) column 52. For each scene, these columns note the video time code of the scene start and finish. In a corresponding manner, the Keyin column 54 and Keyout column 56 note the same points in film footage and frames. The Pullin column 58 and Pullout column 60 specify which of the A, B, C, or D frames in the pulldown sequence correspond to the frame at the start of the scene and the close of the scene. Thus, the FTL gives scene sync information that corresponds to both the video domain and the film domain.

The electronic editing system of the invention accepts a videotape produced by the telecine process and an Evertz FTL, stored on, for example, a floppy disk. When the FTL data on the disk is entered into the system, the system creates a corresponding bin in memory, stored on the system disc, in analogy to a film bin, in which film clips are stored for editing. The electronic bin contains all fields necessary for film editing, all comments, and all descriptions. The particulars of the bin are displayed for the user on one of the system's CRTs. FIG. 5 illustrates the display of the bin. It corresponds directly to the Evertz FTL. The "Start" and "End" columns of the bin correspond to the VideoTape Time Code In and VideoTape Time Code Out columns of the FTL. The "KN Start" and "KN End" columns of the bin correspond to the Keyin and Keyout columns of the FTL. During an editing session, the bin keeps track of the editing chances in both the video time-base and the film footage-base, as described below. Thus, the bin provides the film editor with the flexibility of keeping track of edits in either of the metrics.

Referring again to FIG. 1, when the electronic editing system 10 is provided with a videotape at the start of a film editing session, the videotape recorder 20 provides to the computer 18 the video and audio signals corresponding to the bin. The video signal is first processed by a video A/D coprocessor 26, such as the NuVista board made by TrueVision of Indianapolis, Ind. A suitable video coprocessor includes a video frame grabber which converts analog video information into digital information. The video coprocessor has a memory which is configured using a coprocessor such as the TI34010 made by Texas Instruments, to provide an output data path to feed to the video compression circuitry, such as JPEG circuity, available as chip CL550B from C-Cube of Milpitas, Calif. Such a configuration can be performed using techniques known in the art. A timing circuit 28 controls the speed of the video signal as it is processed.

In operation, the video A/D 26 processes the video signal to reformat the signal so that the video represented by the signal corresponds to film speed, rather than videotape speed. The reformatted signal is then digitized, compressed, and stored in the computer for electronic film editing. This reformatting process allows users to provide the editing system with standard videotapes, in NTSC format, yet allows the video to be edited as if it were film, i.e., running at film speed, as is preferred by most film editors.

Figure 6:
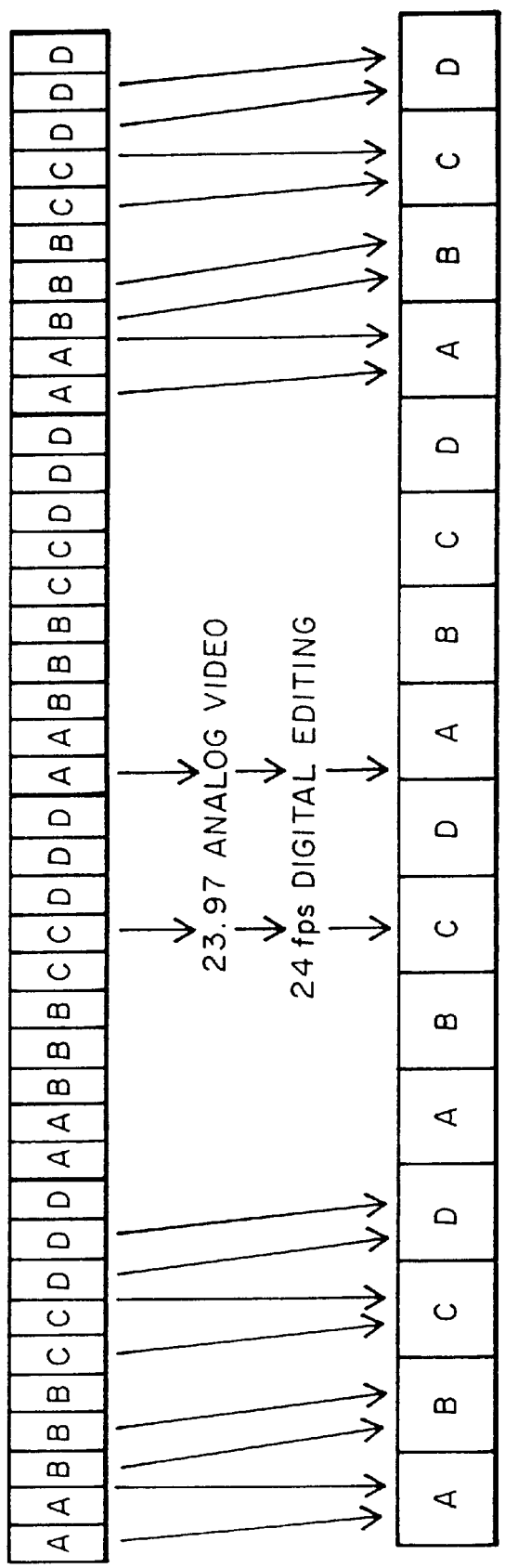
FIG. 6 is a diagram of the scheme employed by the editing system in digitizing a video input to the system.

Referring also to FIG. 6, in this reformatting process, the speed of the video from the videotape is increased from 29.97 fps to 30 fps, as commanded by the timing circuitry 28 (FIG. 1). Then the fields of the video are scanned by the system, and based on the pulldown sequence and pulldown mode specified for each scene by the bin, the redundant video fields added by the telecine process are noted, and then ignored, while the other, nonredundant, fields are digitized and compressed into digital frames. More specifically, a so-called "capture mask" is created for the sequence of video fields; those fields which are redundant are assigned a capture value of "0" while all other fields are assigned a capture value of "1". The system coprocessor reads the entire capture mask and only captures those analog video fields corresponding to a "1" capture value, ignoring all other fields. In this way, the original film frame sequence is reconstructed from the video frame sequence. Once all the nonredundant fields are captured, the fields are batch digitized and compressed to produce digitized frames.

Assuming the use of the 2-3 pulldown scheme, as discussed above, in the capture process, the first two analog video fields (AA in FIG. 6) would each be assigned a capture value of "1", and thus would be designated as the first digital frame; the next two analog video fields BB would also each be assigned a capture value of "1", and be designated as the second digital frame; but the fifth analog video field B, which is redundant, would be assigned a capture value of "0", and would be ignored, and so on. Thus, this process removes the redundant 6 frames added by the telecine process for each film second from the video, thereby producing a digitized representation which corresponds directly to the 24 fps film from which the video was made. This process is possible for either the 2-3 or 3-2 pulldown scheme because the bin specifies the information necessary to distinguish between the two schemes, and the starting frame (i.e., A, B, C, or D) of either sequence is given for each scene.

Appendix A of this application consists of an example of assembly language code for the McIntosh™ computer and the TI 34010 coprocessor for performing the reformatting process. This code is copyrighted, and all copyrights are reserved.

Referring again to FIG. 1, an audio A/D 22 accepts audio from a videotape input to the editing system, and like the video A/D 26, increases the audio speed back to 100%, based on the command of the timing circuitry 28. The audio is digitized and then processed by the audio processor 24, to provide digitized audio corresponding to the reformatted and digitized video. At the completion of this digitization process, the editing system has a complete digital representation of the source film in film format, i.e., 24 fps, and has created a bin with both film footage and video timecode information corresponding to the digital representation, so that electronic editing in either time-base or footage-base may begin.

There are traditionally three different types of film productions that shoot on film, each type having different requirements of the electronic editing system. The first film production type, commercials, typically involves shooting on 35 mm film, transferring the film to a videotape version using the telecine process, editing the video based on the NTSC standard, and never editing the actual film footage, which is not again needed after the film is transferred to video. Thus, the electronic editing is here preferably based on video timecode specifications, not film footage specifications, and an NTSC video is preferably produced at the end of the edit process. The electronic commercial edit should also preferably provide an edit decision list (EDL) that refers back to the video; the edited version of this video is typically what is actually played as the final commercial.

The second production type, episodic film, involves shooting on either 35 or 16 mm film, and producing an NTSC videotape version and additionally, an (optional) edited film version for distribution in markets such as HDTV (High Definition Television) or foreign countries. To produce the edited film footage for the film version, the film is transferred to videotape using the telecine process, and electronic editing of the film is here preferably accomplished based on film footage, and should produce a cutlist, based on film footage specifications, from which the original film is cut and transferred to the NTSC format. To produce a video version, the videotape is then preferably edited based on video timecode specifications to produce an EDL for creating an edited video version.

The third film production type, feature film, typically involves shooting on 35 mm film, and produces a final film product; thus electronic editing is here preferably based on film footage specifications to produce a cutlist for creating a final film version.

Figure 7:
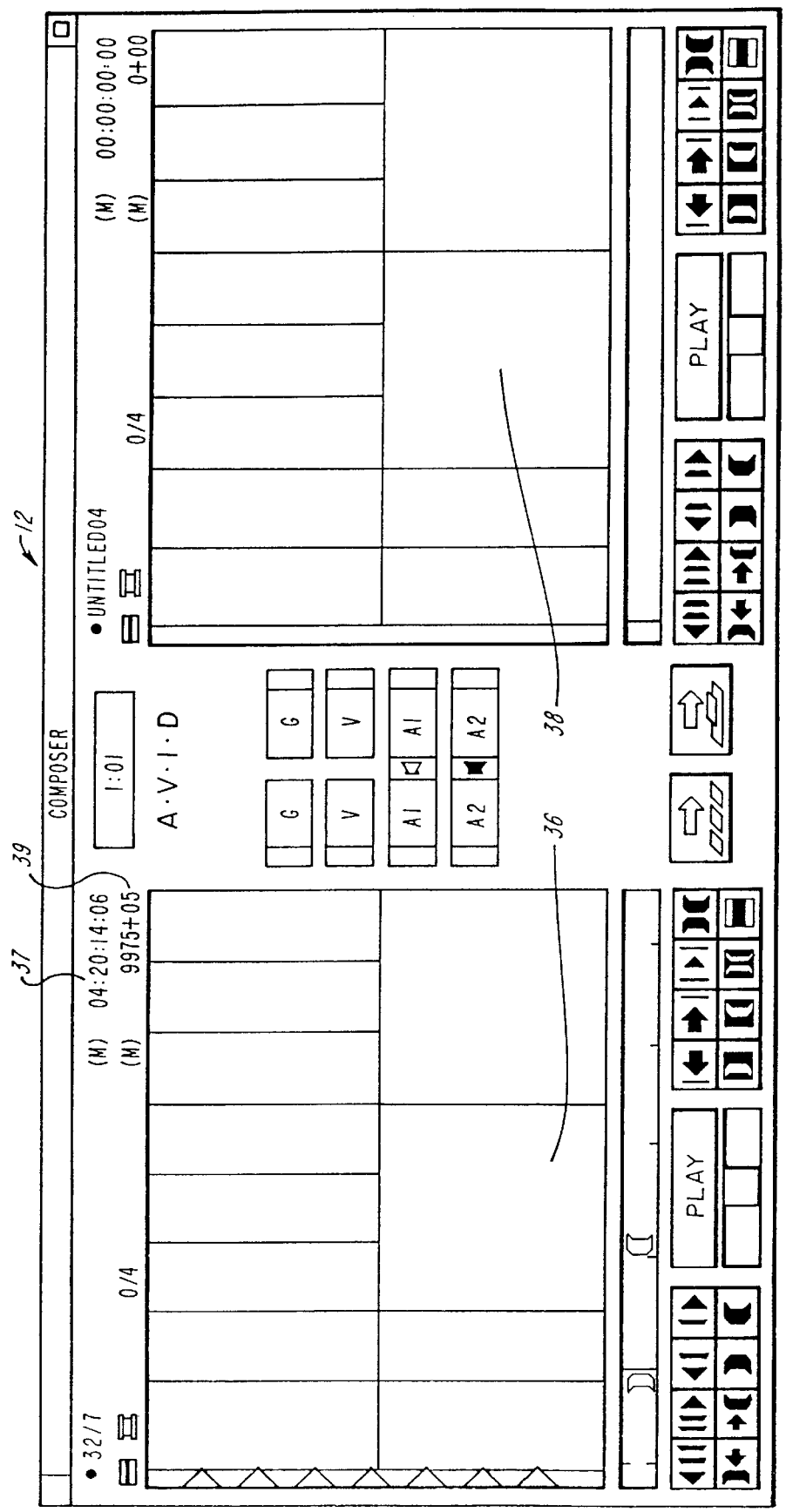
FIG. 7 is an illustration of a video screen showing the digitized video to be edited on the electronic editing system of the invention.

The user interface of the electronic editing system is designed to accommodate film editors concerned with any of the three film production types given above. As shown in FIG. 7, the video display CRT 12 of the system, which includes the source video window 36 and edited video window 38, displays metrics 37, 39 for tracking the position of digital frames in a scene sequence currently being played in the source window or the edit window. These metrics may be in either film footage format or video time code format, whichever is preferred by the user. Thus, those film editors who prefer film footage notation may edit in that domain, while those film editors who prefer video timecode notation may edit in that domain. In either case, the digitized frames correspond exactly with the 24 fps speed of the original source film, rather than the 29.97 fps speed of videotape, so that the electronic edits produced by the electronic editing correspond exactly with the film edits, as if the film were being edited on an old-style flat bed editor.

As an example of an editing session, one scene could be selected from the bin and played on the source window 36 of the system CRT display 12. A film editor could designate frame points to be moved or cut in either timecode or film footage format. Correspondingly, audio points could be designated to be moved or the audio level increased (or decreased). When it is desired to preview a video version of such edits, an NTSC video is created by the system based on the sync information in the electronic bin, from the system disc storage, to produce either a so-called rough cut video, or a final video version. In this process, the system generates an analog version of the digital video signal and restores the redundant video frames necessary for producing the NTSC video rate. The system also produces a corresponding analog audio track and decreases the audio speed so that the audio is synchronized with the video. In this way, the system essentially mimics the telecine process by slowing down the video and audio and producing a 29.97 fps videotape based on a 24 fps source.

Referring again to FIG. 1, in creating an NTSC video from a digitized film version, the video compressor 30 retrieves the digitized video frames from the computer 18 and based on the electronic bin information, designates video fields. The video A/D 26 then creates an analog version of the video frames and processes the frames using a pulldown scheme like that illustrated in FIG. 2 to introduce redundant video frames. The video speed is then controlled by the timing circuit 28 to produce 29.97 fps video as required for an NTSC videotape. Correspondingly, the system audio process 24 and audio A/D 22 processes the digital audio signal based on the electronic bin to generate an analog version of the signal, and then slows the signal by 0.1% to synchronize the audio with the NTSC video. The final video and audio signals are sent to the videotape recorder 20, which records the signals on a videotape.

The electronic editing system may be programmed to produce an edit listing appropriate to the particular media on which the finalized version of the film source material is to appear. If the source film material is to be finalized as film, the system may be specified to produce a cut list. The cut list is a guide for conforming the film negative to the edited video copy of the film footage. It includes a pull list and an assemble list. The assemble list provides a list of cuts in the order in which they must be spliced together on the film. The pull list provides a reel-by-reel listing of each film cut. Each of these lists specifies the sync points for the cuts based on film footage and frame keycode, as if the film had been edited on a flatbed editor. If the source film material is to be finalized as video, the system may be specified to produce an edit decision list (EDL). The EDL specifies sync points in video time code, as opposed to film footage. The editing system generates the requested edit lists based on the electronic bin; as the film is electronically edited, the bin reflects those edits and thus is a revised listing of sync points corresponding to the edited film version. Because the bin is programmed to specify sync points in both film footage and video timecode, the editing system has direct access to either format, and can thereby generate the requested EDL or assemble and pull lists. Appendix B consists of examples of an EDL, assemble lists, and pull lists, all produced by the electronic editing system. Thus, at the end of an electronic film edit, the editing system provides a film editor with an NTSC videotape of the film edits and a edit list for either film or videotape.

Other embodiments of the invention are within the scope of the claims.

What is claimed is:

1. Method for generating a digital representation of a video signal comprised of a sequence of video frames, each frame including two video fields of a duration such that the video plays at a first prespecified rate of frames per second, a prespecified number of redundant video fields being included in the video frame sequence, comprising:

identifying the redundant video fields in the video frame sequence using a data file indicative of a pulldown sequence used to generate the video frame sequence;

capturing the video frame sequence excluding the identified redundant video fields;

storing the captured video frames in an output data file on a random access computer readable medium to generate a digital representation of the video signal which plays at a second prespecified rate of frames per second; and making the output data file accessible by an editing system for editing a sequence of scenes using the output data file.

2. A method for capturing an input sequence of images including redundant fields created from film according to a pulldown sequence, comprising:

receiving the input sequence of images;

accessing an input data file including data indicative of the pulldown sequence used to generate the received input sequence of images;

while receiving the input sequence of images and using the data file indicative of the pulldown sequence, identifying nonredundant fields in the input sequence and storing only the nonredundant fields in an output data file on a random access computer readable medium, whereby an output sequence of images having a one-to-one correspondence with frames in the film is generated; and making the output data file accessible by an editing system for editing a sequence of scenes using the output data file.

3. The method of claim 2, further comprising:

receiving digital audio data corresponding to the output sequence of images; and storing the received digital audio data in an audio data file on the random access computer readable medium in a manner accessible by the editing system, wherein the editing system associates portions of the audio data file with scenes using the output data file.

4. The method of claim 2, further comprising:

assigning a capture mask value to each field of a sequence of fields according to the pulldown sequence indicated by the input data file; and wherein identifying the nonredundant fields includes using the capture mask values.

5. The method of claim 2, wherein the input data file further includes a synchronization point between the film and the input sequence of images.

6. The method of claim 5, further comprising:

assigning a capture mask value to each field of a sequence of fields according to the pulldown sequence and the synchronization point indicated by the input data file; and wherein identifying the nonredundant fields includes using the capture mask values.

7. The method of claim 2, further comprising the step of compressing the output sequence of images.

8. Apparatus for capturing an input sequence of images including redundant fields created from film according to a pulldown sequence, comprising:

an input for receiving the input sequence of images;

means for storing an input data file including data indicative of the pulldown sequence used to generate the received input sequence of images;

a random access computer readable medium on which data files accessible by an editing system are stored for editing a sequence of scenes using the data files; and a processor that, during receipt of the input sequence of images through the input, identifies nonredundant fields of the input sequence of images using the input data file and stores only the nonredundant fields in an output data file on the random access computer readable medium in a manner accessible by the editing system, whereby an output sequence of images having a one-to-one correspondence with frames in the film is generated.

9. The apparatus of claim 8, further comprising:

an input for receiving digital audio data corresponding to the output sequence of images, wherein the received digital audio data is stored in an audio data file on the random access computer readable medium in a manner accessible by the editing system and wherein the editing system associates portions of the audio data file with scenes using the output data file.

10. The apparatus of claim 8, wherein the processor assigns a capture mask value to each field of a sequence of fields according to the pulldown sequence indicated by the input data file and identifies the nonredundant fields using the capture mask values.

11. The apparatus of claim 8, wherein the input data file further includes a synchronization point between the film and the input sequence of images.

12. The apparatus of claim 11, wherein the processor assigns a capture mask value to each field of a sequence of fields according to the pulldown sequence and the synchronization point indicated by the input data file and identifies the nonredundant fields using the capture mask values.

13. The apparatus of claim 8, further comprising the step of compressing the output sequence of images.

14. An apparatus comprising:
a random access computer readable medium for storing a plurality of sequences of digital images from one or more sources of frames captured for playback at a rate of 24 frames per second, wherein each of the sequences of digital images is stored as a data file of a file system of a computer and has images having a one-to-one correspondence with the rate of 24 frames per second, and for storing a plurality of data files containing audio data;
a nonlinear editing system, including:
means for permitting a user to specify scenes from the sequences of digital images stored in the data files on the random access computer readable medium, wherein a scene is defined by a reference to a data file storing a selected one of the sequences of digital images and by frame points designated in the selected sequence of digital images, wherein the frame points may be designated at any frame boundary using a metric based on the playback rate of 24 frames per second;
means for permitting a user to specify a sequence of one or more specified scenes;
means for permitting a user to specify segments of the audio data from the data files stored on the random access computer readable medium to be associated with the specified sequence of scenes from the sequences of digital images; and
means for displaying, during operation of the nonlinear editing system by the user, the specified sequence of scenes from the sequences of digital images from the data files on the random access computer readable medium in synchronization with playback of the associated segments of the audio data from the data files on the random access computer readable medium.

15. The apparatus of claim 14, further comprising means for generating a television signal from the specified sequence of scenes from the sequences of digital images from the data files on the random access computer readable medium, with synchronized audio from the associated segments of the audio data from the data files on the random access computer readable medium.

16. The apparatus of claim 15, wherein the means for generating the television signal includes means for generating redundant video fields within the television signal so that the television signal can be displayed at a frame rate of 29.97 frames per second.

17. The apparatus of claim 16, wherein the audio data in the data files has a playback rate corresponding to a frame rate of 24 frames per second for corresponding images, and the system further comprises means for slowing down playback of the audio to a rate corresponding to a frame rate of 23.976 frames per second for the corresponding images.

18. The apparatus of claim 14, wherein the audio data in the data files has a playback rate corresponding to a frame rate of 23.976 frames per second for corresponding images, and the system further comprises means playing the audio in synchronization with the corresponding images.

19. The apparatus of claim 14, wherein the means for displaying further displays, during operation of the nonlinear editing system by the user, data indicative of a current location of a currently displayed image in one of the sequences of digital images using a metric based on the rate of 24 frames per second.

20. The apparatus of claim 14, wherein the means for displaying further displays, during operation of the nonlinear editing system by the user, data indicative of a current location of a currently displayed image in the specified sequence of scenes from the sequences of digital images using a metric based on the rate of 24 frames per second.

21. The apparatus of claim 14, further including:
means for storing information about the designated frame points of each specified scene from the specified sequence of scenes from the sequences of digital images using a metric based on the rate of 24 frames per second; and
means for updating the stored information with the designated frame points of each specified scene in response to specification of the scenes from the sequence of digital images.

22. The apparatus of claim 14, further comprising means for generating a film cut list that identifies cuts to be made to film so that the film can be edited to correspond to the specified sequence of scenes from the sequences of digital images.

23. The apparatus of claim 14, further comprising means for generating an edit decision list that describes edits to be made to a video sequence corresponding to the source and having a frame rate of 29.97 frames per second, so that the video sequence can be edited to correspond to the specified sequence of scenes from the sequences of digital images.

24. The apparatus of claim 14, wherein the source is film, and the apparatus further comprises:
means for receiving image data from a video tape created using 3-2 pulldown from the film, wherein the image data on the video tape has a frame rate of 29.97 frames per second; and
means for receiving data indicative of redundant fields within the image data on the video tape.

25. The apparatus of claim 24, further comprising:
means for receiving the audio data from the video tape such that the audio data has a rate corresponding to a playback rate of 23.976 frames per second; and
wherein the means for playing back the audio includes means for playing back the audio data at a rate corresponding to a playback rate of 24 frames per second.

26. The apparatus of claim 24, wherein the data indicative of the redundant fields within the image data includes a film transfer log including a synchronization point between the film and the image data and data indicative of a pulldown sequence used to generate the image data.

27. The apparatus of claim 26, further comprising means for generating from the video tape a sequence of digital images stored in a data file of the file system of the computer having images having a one-to-one correspondence with the rate of 24 frames per second according to the film transfer log.

28. The apparatus of claim 14, wherein the nonlinear editing system includes a user interface comprising:
   a source video window in the display for displaying one of the sequences of digital images; and
   an edited video window in the display for displaying the specified sequence of scenes from the sequences of digital images.

29. The apparatus of claim 28, wherein the user interface further comprises:
   a bin window in the display for displaying data indicating the sequences of digital images stored on the random access computer readable medium, wherein the bin window displays information about each of the sequences of digital images using a metric based on the rate of 24 frames per second.

30. The apparatus of claim 29, wherein the user interface further comprises:
   means for displaying data indicating which image in one of the sequences of digital images is currently displayed in the source video window using a metric based on the rate of 24 frames per second;
   wherein the specified sequence of scenes has a duration defined using a metric based on the rate of 24 frames per second, and
   means for displaying data indicating which image in the specified sequence of scenes is currently displayed in the edited video window using a metric based on the rate of 24 frames per second.

31. The apparatus of claim 28, wherein the user interface further comprises:
   means for displaying data indicating which image in one of the sequences of digital images is currently displayed in the source video window using a metric based on the rate of 24 frames per second;
   wherein the specified sequence of scenes has a duration defined using a metric based on the rate of 24 frames per second; and
   means for displaying data indicating which image in the specified sequence of scenes is currently displayed in the edited video window using a metric based on the rate of 24 frames per second.

32. The apparatus of claim 14, wherein the nonlinear editing system includes a user interface comprising:
   means for displaying data indicating which image in one of the sequences of digital images is currently displayed using a metric based on the rate of 24 frames per second;
   wherein the specified sequence of scenes has a duration defined using a metric based on the rate of 24 frames per second; and
   means for displaying data indicating which image in the specified sequence of scenes is currently displayed using a metric based on the rate of 24 frames per second.

33. The apparatus of claim 14, wherein the nonlinear editing system further comprises:
   means for permitting a user to trim in and trim out frame points defining a specified scene.

34. A method comprising:
   storing, on a random access computer readable medium, a plurality of sequences of digital images from one or more sources of frames captured for playback at a rate of 24 frames per second, wherein each of the sequences of digital images is stored in a data file in a file system of a computer and has images having a one-to-one correspondence with the rate of 24 frames per second, and a plurality of data files containing audio data;
   receiving user input to specify scenes from the sequences of digital images stored in the data files on the random access computer readable medium, wherein a scene is defined by a reference to a data file storing a selected one of the sequences of digital images and by frame points designated in the selected sequence of digital images, wherein the frame points may be designated at any frame boundary using a metric based on the rate of 24 frames per second;
   receiving user input to specify a sequence of one or more specified scenes;
   receiving user input to specify segments of the audio data from the data files stored on the random access computer readable medium to be associated with the specified sequence of scenes from the sequences of digital images; and
   displaying, in response to user input, the specified sequence of scenes from the sequences of digital images from the data files on the random access computer readable medium in synchronization with playback of the associated segments of the audio data from the data files on the random access computer readable medium.

35. The method of claim 34, further comprising generating a television signal from the specified sequence of scenes from the sequences of digital images from the data files on the random access computer readable medium, with synchronized audio from the associated segments of the audio data from the data files on the random access computer readable medium.

36. The method of claim 35, wherein generating the television signal includes generating redundant video fields within the television signal so that the television signal can be displayed at a frame rate of 29.97 frames per second.

37. The method of claim 36, wherein the audio data in the data files has a playback rate corresponding to a frame rate of 24 frames per second for corresponding images, and the method further comprises slowing down playback of the audio to a rate corresponding to a frame rate of 23.976 frames per second for the corresponding images.

38. The method of claim 34, wherein the audio data in the data files has a playback rate corresponding to a frame rate of 23.976 frames per second for corresponding images, and the method further comprises playing the audio in synchronization with the corresponding images.

39. The method of claim 34, wherein displaying further includes displaying data indicative of a current location in one of the sequences of digital images of a currently displayed image using a metric based on the rate of 24 frames per second.

40. The method of claim 34, wherein displaying further includes displaying data indicative of a current location in the specified sequence of scenes from the sequences of digital images of a currently displayed image using a metric based on the rate of 24 frames per second.

41. The method of claim 34, further including:
   storing information about the designated frame points of each specified scene from the specified sequence of scenes from the sequences of digital images using a metric based on the rate of 24 frames per second; and
   updating the stored information with the designated frame points of each specified scene in response to the specifying of scenes from the sequences of digital images.

42. The method of claim 34, further comprising generating a film cut list that identifies cuts to be made to film so that the film can be edited to correspond to the specified sequence of scenes from the sequences of digital images.

43. The method of claim 34, further comprising generating an edit decision list that describes edits to be made to a video sequence corresponding to the source and having a frame rate of 29.97 frames per second, so that the video sequence can be edited to correspond to the specified sequence of scenes from the sequences of digital images.

44. The method of claim 34, wherein the source is film, and the method further comprises:
receiving image data from a video tape generated from the film using 3-2 pulldown, wherein the image data has a frame rate of 29.97 frames per second; and
receiving data indicative of redundant fields within the image data on the video tape.

45. The method of claim 44, further comprising:
receiving the audio data from the video tape such that the audio data has a rate corresponding to a playback rate of 23.976 frames per second; and
wherein playing back the audio includes playing back the audio data at a rate corresponding to a playback rate of 24 frames per second.

46. The method of claim 44, wherein the data indicative of the redundant fields within the image data includes a film transfer log having a synchronization point between the film and the image data and data indicative of a pulldown sequence used to generate the image data.

47. The method of claim 46, further comprising:
generating from the video tape a sequence of digital images stored in a data file of the file system of the computer having images having a one-to-one correspondence with the rate of 24 frames per second according to the film transfer log.

48. The method of claim 35, further comprising:
displaying a user interface comprising a source video window in the display for displaying one of the sequences of digital images and an edited video window in the display for displaying the specified sequence of scenes from the sequences of digital images.

49. The method of claim 48, further comprising:
displaying a user interface comprising a bin window in the display for displaying data indicating the sequences of digital images stored on the random access computer readable medium, wherein the bin window displays information about each of the sequences of digital images using a metric based on the rate of 24 frames per second.

50. The method of claim 49, further comprising:
displaying in the user interface data indicating which image in one of the sequences of digital images is currently displayed in the source video window using a metric based on the rate of 24 frames per second;
wherein the specified sequence of scenes has a duration defined using a metric based on the rate of 24 frames per second, and
displaying in the user interface data indicating which image in the specified sequence of scenes is currently displayed in the edited video window using a metric based on the rate of 24 frames per second.

51. The method of claim 48, further comprising:
displaying in the user interface data indicating which image in one of the sequences of digital images is currently displayed in the source video window using a metric based on the rate of 24 frames per second;
wherein the specified sequence of scenes has a duration defined using a metric based on the rate of 24 frames per second; and
displaying in the user interface data indicating which image in the specified sequence of scenes is currently displayed in the edited video window using a metric based on the rate of 24 frames per second.

52. The method of claim 34, further comprising:
displaying a user interface including data indicating which image in one of the sequences of digital images is currently displayed using a metric based on the rate of 24 frames per second;
wherein the specified sequence of scenes has a duration defined using a metric based on the rate of 24 frames per second; and
displaying a user interface including data indicating which image in the specified sequence of scenes is currently displayed using a metric based on the rate of 24 frames per second.

53. The method of claim 34, further comprising:
receiving user input specifying a function to trim in and trim out frame points defining a specified scene.

54. A computer-based nonlinear editing system, comprising:
a random access computer readable medium for storing a plurality of sequences of digital images from one or more sources of frames captured for playback at a rate of 24 frames per second, wherein each of the sequences of digital images is stored as a data file of a file system of a computer and has images having a one-to-one correspondence with the rate of 24 frames per second, and for storing a plurality of data files containing audio data;
an editing interface, including:
a mechanism to permit a user to specify scenes from the sequences of digital images stored in the data files on the random access computer readable medium, wherein a scene is defined by a reference to a data file storing a selected one of the sequences of digital images and by frame points designated in the selected sequence of digital images, wherein the frame points may be designated at any frame boundary using a metric based on the playback rate of 24 frames per second;
a mechanism to permit a user to specify a sequence of one or more of the specified scenes;
a mechanism to permit a user to specify segments of the audio data from the data files stored on the random access computer readable medium to be associated with the specified sequence of scenes from the sequences of digital images; and
an output system that displays to the user, during operation of the nonlinear editing system by the user, the specified sequence of scenes from the sequences of digital images from the data files on the random access computer readable medium and that plays the associated segments of the audio data from the data files on the random access computer readable medium in synchronization with the display.

55. The apparatus of claim 54, wherein the source is film, and the apparatus further comprises:
means for receiving image data from a video tape created using 3-2 pulldown from the film, wherein the image data on the video tape has a frame rate of 29.97 frames per second; and
means for receiving data indicative of redundant fields within the image data on the video tape.

56. The apparatus of claim 55,
wherein the audio data is received from a source such that the audio data has a rate corresponding to a playback rate of 23.976 frames per second; and wherein the output systems plays back the audio data at a rate corresponding to the playback rate of 24 frames per second.

57. An audio-visual work produced by a process comprising:

storing, on a random access computer readable medium, a plurality of sequences of digital images from one or more sources of frames captured for playback at a rate of 24 frames per second, wherein each of the sequences of digital images is stored in a data file in a file system of a computer and has images having a one-to-one correspondence with the rate of 24 frames per second, and a plurality of data files containing audio data;

receiving user input to specify scenes from the sequences of digital images stored in the data files on the random access computer readable medium, wherein a scene is defined by a reference to a data file storing a selected one of the sequences of digital images and by frame points designated in the selected sequence of digital images, wherein the frame points may be designated at any frame boundary using a metric based on the rate of 24 frames per second;

receiving user input to specify a sequence of one or more specified scenes;

receiving user input to specify segments of the audio data from the data files stored on the random access computer readable medium to be associated with the specified sequence of scenes from the sequences of digital images;

displaying, in response to user input, the specified sequence of scenes from the sequences of digital images from the data files on the random access computer readable medium in synchronization with playback of the associated segments of the audio data from the data files on the random access computer readable medium;

generating the audio visual work according to the specified sequence of scenes and the associated specified segments of the audio data.

58. An apparatus comprising:

a random access computer readable medium for storing a plurality of sequences of digital images from one or more sources of frames captured for playback at a rate of 24 frames per second, wherein each of the sequences of digital images is stored as a data file of a file system of a computer and has images having a one-to-one correspondence with the rate of 24 frames per second, and for storing a plurality of data files containing audio data;

a nonlinear editing system, including:

means for permitting a user to specify scenes from the sequences of digital images stored in the data files on the random access computer readable medium, wherein a scene is defined by a reference to a data file storing a selected one of the sequences of digital images and by frame points designated in the selected sequence of digital images, wherein the frame points may be designated at any frame boundary using a metric based on the playback rate of 24 frames per second;

means for permitting a user to specify a sequence of one or more specified scenes;

means for permitting a user to specify segments of the audio data from the data files stored on the random access computer readable medium to be associated with the specified sequence of scenes from the sequences of digital images; and means for producing an edit listing from the specified sequence of scenes in accordance with a selected one of a plurality of output frame rates.

59. The apparatus of claim 58, wherein one of the plurality of output formats includes video played back at a rate of 29.97 frames per second.

60. The apparatus of claim 58, further including:

means for storing information about the designated frame points of each specified scene from the specified sequence of scenes from the sequences of digital images using a metric based on the rate of 24 frames per second; and means for updating the stored information with the designated frame points of each specified scene in response to specification of the scenes from the sequence of digital images.

61. The apparatus of claim 60, wherein the stored information further comprises information about the designated frame points of each of the specified scenes from the specified sequence of scenes from the sequences of digital images using a metric based on the rate of 29.97 frames per second.

62. An apparatus comprising:

a random access computer readable medium for storing a plurality of sequences of digital images from one or more sources of frames captured for playback at a rate of 24 frames per second, wherein each of the sequences of digital images is stored as a data file of a file system of a computer and has images having a one-to-one correspondence with the rate of 24 frames per second, and for storing a plurality of data files containing audio data;

a nonlinear editing system, including:

means for permitting a user to specify scenes from the sequences of digital images stored in the data files on the random access computer readable medium, wherein a scene is defined by a reference to a data file storing a selected one of the sequences of digital images and by frame points designated in the selected sequence of digital images, wherein the frame points may be designated at any frame boundary using a metric based on the playback rate of 24 frames per second;

means for permitting a user to specify a sequence of one or more specified scenes;

means for permitting a user to specify segments of the audio data from the data files stored on the random access computer readable medium to be associated with the specified sequence of scenes from the sequences of digital images; and means for storing information about the designated frame points of each specified scene from the specified sequence of scenes from the sequences of digital images using a metric based on the rate of 24 frames per second and a second frame rate different from the rate of 24 frames per second; and means for updating the stored information with the designated frame points of each specified scene in response to specification of the scenes from the sequence of digital images.

63. The apparatus of claim 62, further comprising:

means for producing an edit listing from the specified sequence of scenes in accordance with a selected one of a plurality of output frame rates.

* * * * *